E. M. COLLIER.
CHECK WIRE FOR PLANTERS.
APPLICATION FILED JUNE 14, 1918.

1,298,898.

Patented Apr. 1, 1919.

Inventor
Edward M. Collier
By Victor J. Evans
Attorney

UNITED STATES PATENT OFFICE.

EDWARD M. COLLIER, OF PETERSBURG, VIRGINIA.

CHECK-WIRE FOR PLANTERS.

1,298,898.     Specification of Letters Patent.     Patented Apr. 1, 1919.

Application filed June 14, 1918. Serial No. 240,002.

*To all whom it may concern:*

Be it known that I, EDWARD M. COLLIER, a citizen of the United States, residing at Petersburg, in the county of Dinwiddie and State of Virginia, have invented new and useful Improvements in Check-Wires for Planters, of which the following is a specification.

It is the usual practice to employ check wires for corn planters and similar machines which are of the maximum length required, the wire proper being of a continuous length, requiring that it be folded or rolled or reeled when not in use or when it is necessary to transport the same from place to place, and in addition to this advantage, resulting from the unavoidable injury to the wire due to kinking and the like, difficulty is experienced in planting short rows as in angles or offsets of the field, when only a portion of the full length of the wire can be used, and further difficulties are encountered in the use of devices of this kind in a field which is more or less obstructed by trees or tall stumps or trunks over which the wire cannot be carried, and thus necessitating the pulling in of one end of the wire and re-extending it after passing the obstruction with the incident risk above noted of kinking or injuring the wire in the operation, or if the wire is cut in order to pass an obstruction, the rejoining of the ends or the splicing of the same shortens the distance between adjacent portions, and hence destroys the alinement of the hills in the field and involves further difficulties in harvesting as well as in cultivating.

It is the object of this invention to avoid these various disadvantages by providing a check wire of sectional construction, of which any desired length may be employed and of which the sections may be disconnected and reunited without affecting the wire itself or altering the intervals between the check buttons, and therefore which can be manipulated to pass obstructions in the field or to operate the droppers in planting short rows, and further which, when not in use may be arranged in compact form for transportation or storage without the risk of causing deterioration of the device or any of its elements.

Further objects and advantages will appear in the course of the following description, it being understood that changes in form, proportion and details may be resorted to, within the scope of the appended claims, without departing from the spirit of the invention.

In the drawing:—

Figure 4:
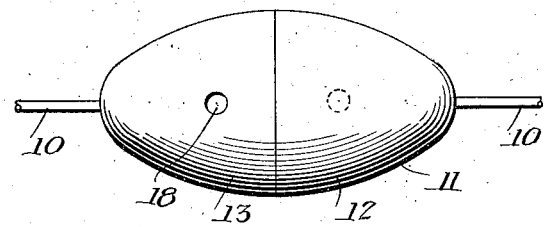
Fig. 4 is a view in elevation of one of the check buttons.
Figure 2:
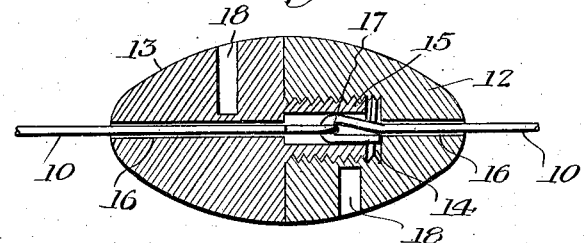
Fig. 2 is a detail sectional view of one of the check buttons and the related elements of the wire attached thereto.
Figure 3:
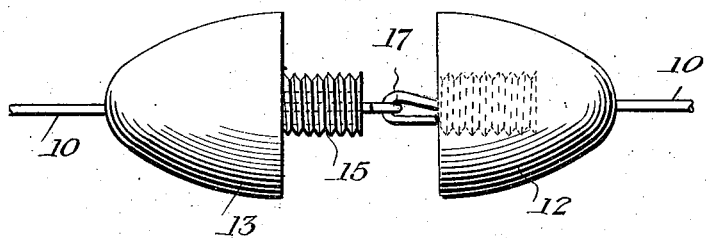
Fig. 3 is a similar view showing the elements of the buttons separated.
Figure 1:
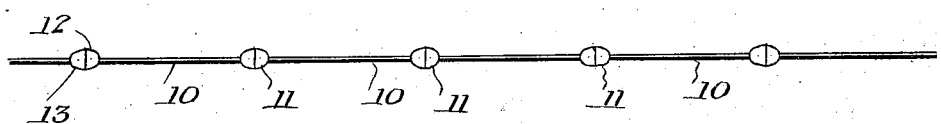
Figure 1 is a view of a short length of check wire constructed in accordance with the invention.

The wire proper is formed of a series of separate sections 10, each being of a length suitable for the interval required between adjacent buttons 11, and each button consists of separable members or elements 12 and 13 provided respectively with a threaded socket 14 and a threaded stud 15 for engagement with said socket. The wire sections are inserted in longitudinal or axial bores 16 of said members and have their extremities interlocked by means of engaging hooks 17 which, when the members of the button are united are housed within the socket and, while being protected, are held against disengagement through accident.

It will be noted that the members or elements of each button are thus carried respectively by the terminals of adjoining wire sections which are of the length determined upon as the desired interval between the buttons, said button members, which are respectively male and female for engagement with facility to connect adjoining wire sections, being swiveled upon the wire sections by which they are carried, so as to permit of their relative rotary movement to effect the desired interlocking engagement.

To facilitate tightening or loosening the elements they may have transverse tool sockets 18 for the reception of pins or nails or any other accessible devices to afford a leverage or a purchase should difficulty be experienced, for example, in disconnecting the elements of a button at a point determined upon for the separation or division of the wire length when a relatively short section is desired for use in planting short rows.

When it is desired to pass an obstacle in the field, that is to extend the check wire on one side of such an obstruction when the planting has been finished on the other side, it is simply necessary to disconnect two of the button members at a suitable point, and carry the end beyond the obstruction, and when the use of the device has been completed and it is desired to pack the same for transportation or storage, the various sections may be disconnected, or the complete wire may be divided up into relatively short sections to form a convenient bundle or package while retaining the wire element in a straight or extended form to avoid kinking or breaking.

Having described the invention what is claimed is:—

1. A check wire for planters having a plurality of sections detachably interlocked terminally in series, and buttons housing and securing the interlocked terminals in engagement, and each consisting of interlocking members carried respectively by the adjacent ends of adjoining sections.

2. A check wire for planters having a plurality of wire sections provided with terminal interlocking hooks, and buttons located at and housing said terminal hooks of the wire sections and each consisting of separable interlocking members respectively engaging the adjacent ends of adjoining wire sections.

3. A check wire for planters having a plurality of wire sections detachably connected in series by terminal hooks, and buttons located at and housing the connected terminals of said wire sections, and each consisting of male and female detachable members having longitudinal bores for receiving and transversely confining the terminal hooks of the wire sections.

In testimony whereof I affix my signature.

EDWARD M. COLLIER.

Copies of this patent may be obtained for five cents each, by addressing the "Commissioner of Patents, Washington, D. C."